US008723971B2

(12) United States Patent
Kamiya et al.

(10) Patent No.: US 8,723,971 B2
(45) Date of Patent: May 13, 2014

(54) TRANSMISSION SYSTEM, IMAGING APPARATUS, AND TRANSMISSION METHOD

(75) Inventors: Koji Kamiya, Kanagawa (JP); Nobuo Ohishi, Shizuoka (JP)

(73) Assignee: Sony Corporation, Tokyo (JP)

( * ) Notice: Subject to any disclaimer, the term of this patent is extended or adjusted under 35 U.S.C. 154(b) by 565 days.

(21) Appl. No.: 12/970,106

(22) Filed: Dec. 16, 2010

(65) Prior Publication Data

US 2011/0149162 A1 Jun. 23, 2011

(30) Foreign Application Priority Data

Dec. 22, 2009 (JP) .............................. P2009-291061

(51) Int. Cl.
*H04N 5/232* (2006.01)
(52) U.S. Cl.
USPC ................................... 348/211.1; 348/211.6
(58) Field of Classification Search
USPC .................... 348/211.1, 211.4, 211.6, 211.14
See application file for complete search history.

(56) References Cited

U.S. PATENT DOCUMENTS 5,565,897 A * 10/1996 Kikinis et al. ................. 345/213
7,508,452 B2 * 3/2009 Mori et al. ..................... 348/553

FOREIGN PATENT DOCUMENTS

JP 5 292447 11/1993

* cited by examiner

*Primary Examiner* — Timothy J Henn
(74) *Attorney, Agent, or Firm* — Frommer Lawrence & Haug LLP; William S. Frommer (57) ABSTRACT

Disclosed herein is a transmission system including a digital transmission path configured to transmit a digital video signal outputted from an imaging apparatus to a processing apparatus that executes one of processing and relaying of a video signal received from the imaging apparatus, an analog transmission path configured to transmit an analog reference signal outputted from the processing apparatus to the imaging apparatus, a command superposing block in the processing apparatus configured to superpose, at an analog level, each bit of command data for commanding the imaging apparatus in other than a section in which a synchronous signal component of the reference signal is included, a digital conversion block configured to digitally convert an analog-level signal of each bit of a command included in a reference signal received via the analog transmission path in the imaging apparatus, and an imaging control block configured to control an imaging operation.

7 Claims, 7 Drawing Sheets

TRANSMISSION SYSTEM, IMAGING APPARATUS, AND TRANSMISSION METHOD

BACKGROUND OF THE INVENTION

1. Field of the Invention

The present invention relates to a transmission system suitably applicable to the transmission between an imaging apparatus and an apparatus for receiving or relaying video signals from the imaging apparatus, an imaging apparatus applied to this transmission system, and a transmission method applied to this transmission system.

2. Description of the Related Art

With related-art systems having two or more imaging apparatuses for use in the recording in broadcasting stations, various types of studios, and stages, for example, it is a general practice to generate a reference signal for determining a reference imaging timing and supply the generated reference signal to all of two or more imaging apparatuses. This reference signal includes the vertical synchronous and horizontal synchronous signals of a video signal. Each of the imaging apparatuses outputs a video signal obtained by the imaging that is synchronized with the supplied reference signal. This arrangement provides a video signal having a timing with all video signals supplied from two or more imaging apparatuses synchronized, thereby allowing the smooth switching and editing of images, for example.

Further, in taking images by use of two or more imaging apparatuses, it is sometimes practiced that a control apparatus for controlling each of the imaging apparatuses sends commands to the imaging apparatus to execute various adjustments on the imaging apparatus.

Figure 7:
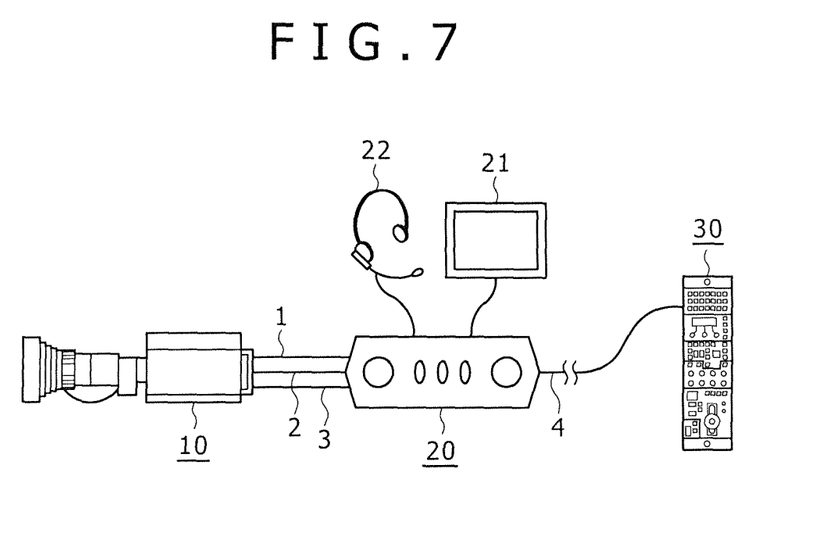
FIG. 7 is a schematic diagram illustrating an exemplary connection configuration of a related-art imaging apparatus.

Referring to FIG. 7, there is shown an example of the connection between a related-art camera apparatus and a related-art control apparatus. In this example, a camera apparatus 10 is configured as a relatively small-size, monitorless camera called a POV (Point Of View) camera. The POV camera is often arranged at positions taking advantage of the small size, on drive mechanisms such as small-size cranes and pan tilter and at locations hidden in stages and studios, for example. The camera apparatus 10 is connected to a control apparatus 30 via an adaptor apparatus 20. The adaptor apparatus 20 provides the connection between the camera apparatus 10 and a monitor 21 and a headset microphone 22 and executes relay processing between the camera apparatus 10 that is a POV camera and the control apparatus 30.

In the example shown in FIG. 7, the camera apparatus 10 and the adaptor apparatus 20 are interconnected with three cables of a digital transmission path 1, an analog transmission path 2, and a control command transmission path 3. The adaptor apparatus 20 and the control apparatus 30 are interconnected with an optical fiber cable 4. The distance between the camera apparatus 10 and the adaptor apparatus 20 is often comparatively short, about several meters for example. The distance between the adaptor apparatus 20 and the control apparatus 30 is sometimes very long depending on the system configuration.

The digital transmission path 1 connecting between the camera apparatus 10 and the adaptor apparatus 20 transmits digital video signals imaged and outputted by the camera apparatus 10. The analog transmission path 2 transmits, to the camera apparatus 10 as an analog reference signal, the reference signal transmitted from the control apparatus 30 to the adaptor apparatus 20. The control command transmission path 3 transmits control command between the camera apparatus 10 and the adaptor apparatus 20.

The optical fiber cable 4 connecting between the adaptor apparatus 20 and the control apparatus 30 transmits digital video signals from the camera apparatus 10 to the control apparatus 30 and a reference signal from the control apparatus 30 to the adaptor apparatus 20 as a digital signal. Further, control commands are transmitted as superposed with a digital video signal or a reference signal.

The connection configuration shown in FIG. 7 allows a POV camera not originally having a monitor to be connected with the monitor 21 and headset microphone 22 through the adaptor apparatus 20, thereby achieving substantially the same feel of the operation and use provided by ordinary video cameras.

SUMMARY OF THE INVENTION

As seen from the connection shown in FIG. 7, the camera apparatus 10 and the adaptor apparatus 20 have to be interconnected with three transmission paths 1, 2, and 3. These connection cables present problems of inconvenience in cable laying and camera handling.

If an optical fiber cable can be directly connected to the camera apparatus, the adaptor and the camera apparatus can be interconnected by only a single optical cable. However, the connection block through which the optical fiber cable is connected to the camera apparatus is so complicated in both circuit configuration and mechanical configuration. To be more specific, the camera apparatus 10 that is a POV camera has no monitor to achieve small size and therefore is desirably such configured in the input/output terminal block as to be small and simple as far as possible. Hence, in the example shown in FIG. 7, signals are transmitted between the camera apparatus 10 and the adaptor apparatus 20 along different transmission paths 1, 2, and 3, thereby eliminating the necessity of installing an optical fiber cable input/output block on the camera apparatus 10 to achieve the small-sized input/output block. The reception by the camera apparatus 10 of a reference signal as an analog signal is aimed to achieve a simplified and size-reduced configuration of mainly the input block of the camera apparatus.

As disclosed in Japanese Patent Laid-Open No. Hei 5-292447 referred to as Patent Document 1 hereinafter, the multiplexing of control commands with the vertical blanking interval of an analog video signal has been proposed. However, with the system as shown in FIG. 7, control commands have to be transmitted bidirectionally between the control apparatus 30 and the camera apparatus 10, thereby disabling the multiplexing of control commands with the vertical blanking interval as shown in Patent Document 1 above. In addition, the data volume that can be transmitted during such an interval in which video contents are not transmitted as the vertical blanking interval is limited, so that the disclosed configuration is not suitable for uses in which commands are transmitted as serial data normally generated by the control apparatus, for example.

There is a desire for the present invention to reduce the number of cables necessary for the connection between the component apparatuses without adversely affecting the downsizing of the camera apparatus in connecting the camera apparatus in the system configuration of the above-mentioned type.

In carrying out the invention and according to one embodiment thereof, there is provided a transmission system including:

a digital transmission path configured to transmit a digital video signal outputted from an imaging apparatus to a processing apparatus that executes one of processing and relaying of a video signal received from the imaging apparatus;

an analog transmission path configured to transmit an analog reference signal outputted from the processing apparatus to the imaging apparatus;

a command superposing block in the processing apparatus configured to superpose, at an analog level, each bit of command data for commanding the imaging apparatus in other than a section in which a synchronous signal component of the reference signal is included;

a digital conversion block configured to digitally convert an analog-level signal of each bit of a command included in a reference signal received via the analog transmission path in the imaging apparatus; and an imaging control block configured to control an imaging operation with a timing synchronized with a synchronous signal component included in a reference signal received via the analog transmission path and discriminate a command converted by the digital conversion block, thereby executing processing corresponding to the discriminated command in the imaging apparatus.

According to another embodiment of the present invention, there is an imaging apparatus including:

an imaging processing block configured to take an image to obtain a video signal;

a digital video signal output block configured to output a video signal obtained by the imaging processing block to a digital transmission path;

an analog reference signal input block configured to input an analog reference signal into the imaging apparatus;

a digital conversion block configured to digitally convert a signal of an analog level of each bit of a command included in the reference signal entered through the analog reference signal input block; and a controller configured to control an imaging operation by the imaging processing block with a timing synchronized with a synchronous signal component included in a reference signal entered through the analog reference signal input block and discriminate the command converted by the digital conversion block, thereby executing control processing corresponding to the discriminated command.

According to further embodiment of the present invention, there is a transmission method of signal transmission by use of a digital transmission path configured to transmit a digital video signal outputted from an imaging apparatus to a processing apparatus that executes one of processing and relaying of a video signal received from the imaging apparatus and an analog transmission path configured to transmit an analog reference signal outputted from the processing apparatus to the imaging apparatus, the transmission method including the steps of:

superposing, at an analog level, each bit of command data for commanding the imaging apparatus in other than a section in which a synchronous signal component of the reference signal is included in the processing apparatus;

digitally converting an analog-level signal of each bit of a command included in a reference signal received via the analog transmission path; and controlling an imaging operation with a timing synchronized with a synchronous signal component included in a reference signal received via the analog transmission path and discriminating a command converted by the digital conversion block, thereby executing processing corresponding to the discriminated command.

According to the embodiments of the present invention, command data is transmitted as superposed as an analog voltage in a section other than a section in which a synchronous signal component of an analog reference signal to be transmitted over an analog transmission path, thereby the command data as serial data of a comparatively large data volume. This novel configuration allows the transmission of command data as serial data from the processing apparatus side to the imaging apparatus side over the transmission path for transmitting analog reference signals, thereby transmitting commands to the imaging apparatus without specially arranging a transmission path dedicated to command data. The transmission of commands from the imaging apparatus side to the outside the system can be realized by attaching commands as auxiliary data of a digital video signal to be transmitted over the digital transmission path for example. Consequently, only the two transmission paths, the analog transmission path and the digital transmission path, allow the bidirectional transmission of commands between the imaging apparatus and the processing apparatus.

According to the embodiments of the invention, interconnecting an imaging apparatus and a processing apparatus only with two transmission paths, an analog transmission path and a digital transmission path, allows the bidirectional transmission of commands between the imaging apparatus and the processing apparatus. Besides, because signals to be captured by the imaging apparatus are analog, the input block of the imaging apparatus can be simplified in configuration, which in turn simplifies the connection of the imaging apparatus that requires a reference signal.

BRIEF DESCRIPTION OF THE DRAWINGS

The above and other features of the invention will become apparent from the following description of embodiments with reference to the accompanying drawings in which.

DETAILED DESCRIPTION OF THE PREFERRED EMBODIMENTS

Figure 1:
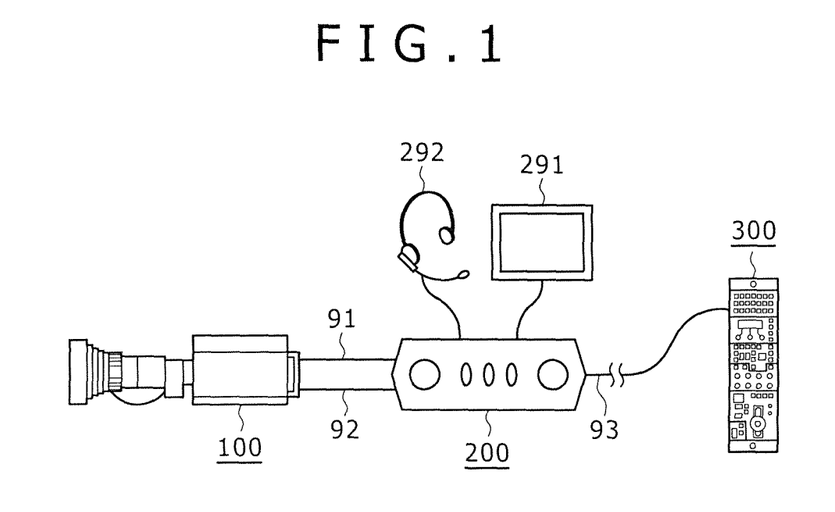
FIG. 1 is a schematic diagram illustrating an exemplary connection configuration practiced as one embodiment of the invention.
Figure 2:
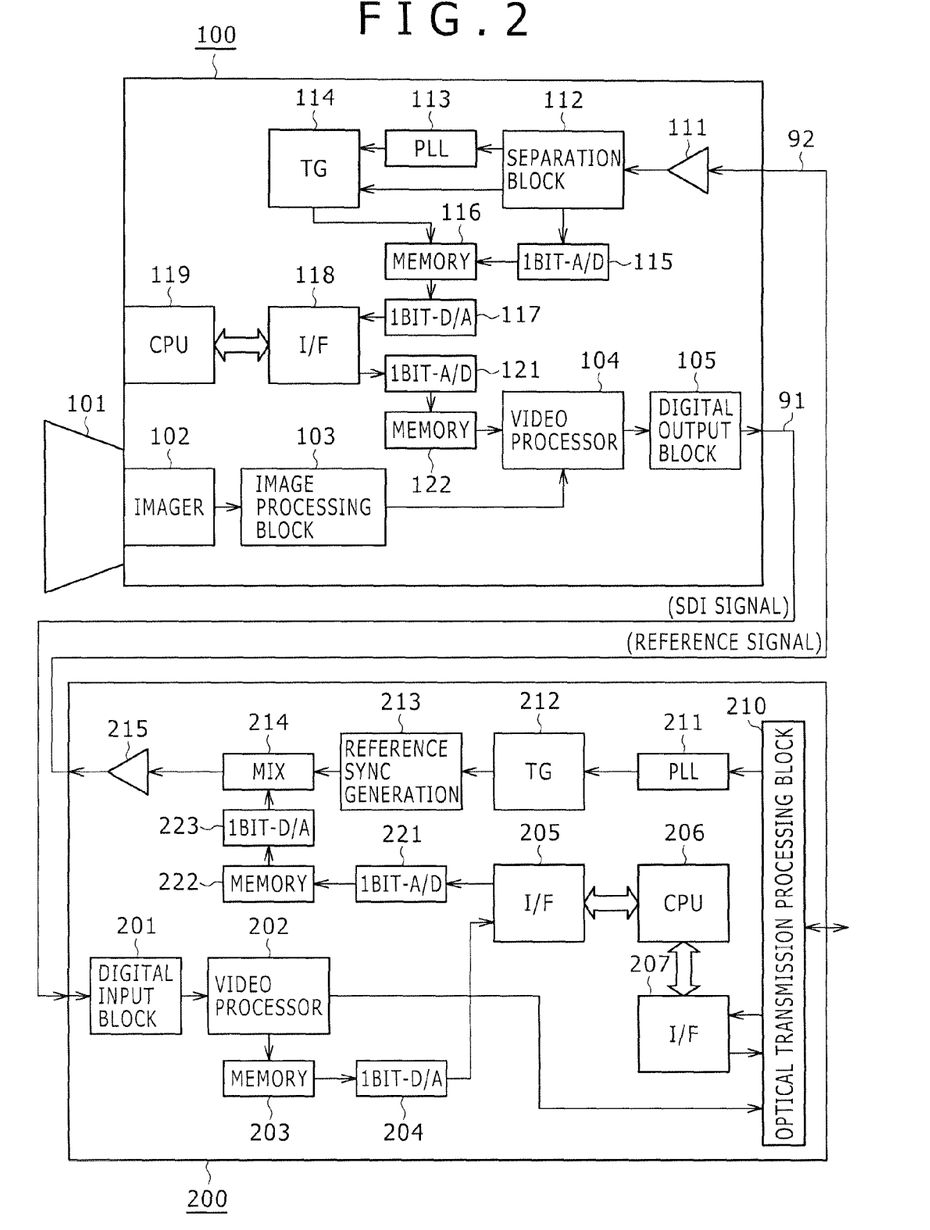
FIG. 2 is a block diagram illustrating exemplary configurations of an imaging apparatus and an adaptor apparatus practiced as one embodiment of the invention.

This invention will be described in further detail by way of embodiments thereof in the following order with reference to the accompanying drawings:

(1) Configuration of the entire system (FIG. 1);
(2) Configurations of an imaging apparatus and an adaptor apparatus (FIG. 2);
(3) Configuration of transmission signals (FIGS. 3A to 4C); and
(4) Other configurations of transmission signals (FIGS. 5A to 6C).

(1) Configuration of the Entire System

First, referring to FIG. 1, an exemplary configuration of the entire system practiced as one embodiment of the invention will be described.

In the system configuration of the present embodiment, a camera apparatus 100 that is a comparatively small-sized imaging apparatus called a POV (Point of View) camera is prepared to be connected to a control apparatus 300. The control apparatus 300 executes various kinds of control operations associated with the imaging operations done by the camera apparatus 100. If the control apparatus 300 has a video processing feature, the control apparatus 300 is capable of converting, distributing, and monitor-outputting the video signals received from the camera apparatus 100. It should be noted that, in FIG. 1, the control apparatus 300 is shown as a control panel on which the user executes camera apparatus control operations, which includes a control unit called CCU (Camera Control Unit). It should also be noted that any video processing apparatus connectable to a camera apparatus, other than control, may be connected to the camera apparatus.

As shown in FIG. 1, the camera apparatus 100 is connected to the control apparatus 300 through an adaptor apparatus 200. The camera apparatus 100 and the adaptor apparatus 200 are interconnected with two cables, a digital transmission path 91 and an analog transmission path 92. The adaptor apparatus 200 and the control apparatus 300 are interconnected with an optical fiber cable 93. Between the camera apparatus 100 and the adaptor apparatus 200, the adaptor apparatus 200 is arranged in the proximity of the camera apparatus 100 with a comparatively short distance of about several meters for example. The adaptor apparatus 200 and the control apparatus 300 may be separated from each other by a very long distance depending on the system configuration.

The adaptor apparatus 200 is connected with a monitor apparatus 291 and a headset microphone 292 for communication with the operator of the control apparatus 300, for example. It should be noted that the adaptor apparatus 200 may have an operation section for remotely operating the camera apparatus 100.

The digital transmission path 91 connecting between the camera apparatus 100 and the adaptor apparatus 200 transmits digital video signals generated and outputted by the camera apparatus 100. The analog transmission path 92 transmits a reference signal, transmitted from the control apparatus 300 to the adaptor apparatus 200, to the camera apparatus 100 as an analog reference signal. The digital transmission path 91 and the analog transmission path 92 are based on coaxial cables for example. In the case of the present embodiment, the reference signal transmitted by the analog transmission path 92 is multiplexed with a command signal to be transmitted to the camera apparatus 100. A configuration in which a command signal is superposed will be described later.

A digital video signal to be transmitted from the camera apparatus 100 to the adaptor apparatus 200 is also superposed on a command signal. For example, on the digital transmission path 91, a digital video signal is transmitted from the camera apparatus 100 as an HD-SDI signal; an area in which additional information of this HD-SDI signal is arranged is added with a command that is issued from the camera apparatus 100 to the control apparatus 300.

The optical fiber cable 93 connecting between the adaptor apparatus 200 and the control apparatus 300 transmits a digital video signal from the camera apparatus 100 to the control apparatus 300 and a reference signal from the control apparatus 300 to the adaptor apparatus 200 as a digital signal.

A control command from the control apparatus 300 to the camera apparatus 100 and a control command from the camera apparatus 100 to the control apparatus 300 are also multiplexed with the optical fiber cable 93.

It should be noted that, in the present embodiment, these control commands are serial communication commands that are consecutively generated and transmitted.

(2) Configurations of an Imaging Apparatus and an Adaptor Apparatus

The following describes the internal configurations of the camera apparatus 100 and the adaptor apparatus 200 with reference to FIG. 2. FIG. 2 mainly shows the configurations associated with the signal transmission that takes place between the camera apparatus 100 and the adaptor apparatus 200, omitting the portions that are not directly related with the processing of the present embodiment.

The camera apparatus 100 takes an image entered in an imager 102 through a lens 101 to get an electrical image signal and supply this image signal to an image processing block 103. For the imager 102, various types of solid-state imaging elements, such as a CCD (Charge Coupled Device) imager and a CMOS (Complementary Metal Oxide Semiconductor) image, are available.

The image processing block 103 executes necessary processing on the image signal supplied from the imager 102 and supplies the processed image signal to a video processor 104. The video processor 104 converts the processed image signal into a digital video signal having a predetermined format (an HD-SDI signal in this example) and supplies the obtained digital video signal to a digital output block 105. It should be noted that a command generated by a CPU (Central Processing Unit) 119 is also supplied to the video processor 104. The video processor 104 adds the supplied command to the auxiliary data area of the HD-SDI signal and supplies this signal to the digital output block 105.

The digital output block 105 outputs the HD-SDI signal that is a digital video signal to the connected digital transmission path 91.

It should be noted that the processing timing between the imaging by the imager 102 and the outputting from the digital output block 105 is controlled by a timing control signal generated and supplied by a timing generator 114, which will be described later.

The analog transmission path 92 connected to the camera apparatus 100 is input-processed by an analog input block 111. The analog input block 111 is configured by a buffer amplifier and so on. The reference signal received by the analog input block 111 through the analog transmission path 92 is supplied to a separation block 112.

The separation block 112 separates synchronous signal components from the reference signal and, at the same time, separates data, such as a command, multiplexed with the reference signal. The separated synchronous signal components are a horizontal synchronous signal component and a vertical synchronous signal component, which are individually separated. The horizontal synchronous signal component separated by the separation block 112 is supplied to a PLL (Phase Locked Loop) 113, which generates a frequency signal locked with the horizontal synchronous signal component and supplies the generated frequency component to the timing generator 114. The vertical synchronous signal component separated by the separation block 112 is supplied to the timing generator 114.

The data separated by the separation block 112 is supplied to an analog/digital converter 115 to be converted into digital data, the resultant digital data being stored in a memory 116. The data stored in the memory 116 is converted by a digital/ analog converter 117 into a signal having a voltage based on this data, which is then supplied to a central processing unit 119 via an interface block 118. It should be noted that the analog/digital converter 115 is an analog/digital converter of 1-bit type for example, which executes conversion by a sampling frequency of 74 MHz in this example. The digital/analog converter 117 is a digital/analog converter of 1-bit type for example, which executes conversion by a sampling frequency of 37 MHz in this example. The read/write operations on the memory 116 are controlled by the timing generator 114.

The central processing unit 119 functions as an imaging control block for controlling imaging operations and so on in the camera apparatus 100. In this case, various control operations are executed by control commands that are supplied through the interface block 118.

A command issued in response to a control command received by the central processing unit 119 and a control command to be transmitted to the control apparatus 300 are supplied to an analog/digital converter 121 via the interface block 118 to be converted into digital data, which is then stored in a memory 122. The data stored in the memory 122 is supplied to the video processor 104 to be added to a digital video signal.

The following describes the configuration of the adaptor apparatus 200 with reference to FIG. 2.

The adaptor apparatus 200 has a digital input block 201 to which the digital transmission path 91 is connected, supplying a signal entered in the digital input block 201 to a video processor 202. The video processor 202 supplies the received digital video signal to an optical transmission processing block 210, making the optical transmission processing block 210 execute the processing of transmitting the digital video signal over the optical fiber cable 93. At the same time, the video processor 202 extracts data, such as a command, from the received digital video signal, stores the extracted data in a memory 203, and makes a digital/analog converter 204 convert the digital video signal into a voltage signal based on the stored data. The resultant voltage signal is supplied to a central processing unit 206 via an interface block 205. If the received data is a command for the adaptor apparatus 200, the central processing unit 206 executes the corresponding processing. If the received data is a command for the control apparatus 300, the central processing unit 206 supplies this command to the optical transmission processing block 210 via an interface block 207 to transmit this command over the optical fiber cable 93.

The signal transmitted over the optical fiber cable 93 is input-processed by the optical transmission processing block 210 and the synchronous signal component of the resultant signal (namely, a reference signal) is supplied to a PLL circuit 211, thereby generating a clock synchronized with the reference signal. The generated clock is supplied to a timing generator 212 to generate a timing signal synchronized with the synchronous signal component of the received reference signal, the generated timing signal being supplied to a reference signal generation block 213.

The reference signal generation block 213 generates an analog reference signal in synchronization with the supplied timing signal and supplies the generated reference signal to a mixing block 214. The mixing block 214 superposes data, such as a control command, outputted from a digital/analog converter 223 onto the reference signal. The timing of this superposition is controlled by the timing generator 212. The timing to be superposed will be detailed later.

A control command in the signal transmitted over the optical fiber cable 93 and received by the optical transmission processing block 210 is supplied to the central processing unit 206 via the interface block 207, thereby making the central processing unit 206 execute necessary processing. The control command transmitted from the control apparatus 300 side over the optical fiber cable 93 is a serial command that is transmitted consecutively.

The data, such as a command, supplied to the central processing unit 206 is supplied to an analog/digital converter 221 via the interface block 205 to be digitally converted. The resultant digital data is stored in a memory 222. The data is then read from the memory 222 to be converted, bit-by-bit, by the digital/analog converter 223 into voltage signal, which is supplied to the mixing block 214 to be superposed onto a predetermined position of the reference signal. It should be noted that the analog/digital converter 221 is a 1-bit analog/digital converter for example and executes conversion by a sampling frequency of 37 MHz in this example. The digital/analog converter 223 is a 1-bit digital/analog converter for example and executes conversion by a sampling frequency of 74 MHz in this example.

The reference signal mixed with a control command and so on in the mixing block 214 that is a command superposing block is supplied to an analog output block 215 to be outputted to the connected analog transmission path 92, being transmitted to the camera apparatus 100 side.

(3) Configuration of Transmission Signals

The following describes a configuration of an analog reference signal to be transmitted from the adaptor apparatus 200 to the camera apparatus 100 via the analog transmission path 92 and the processing of transmission in this configuration with reference to FIG. 3A to FIG. 4C.

Figure 3A:
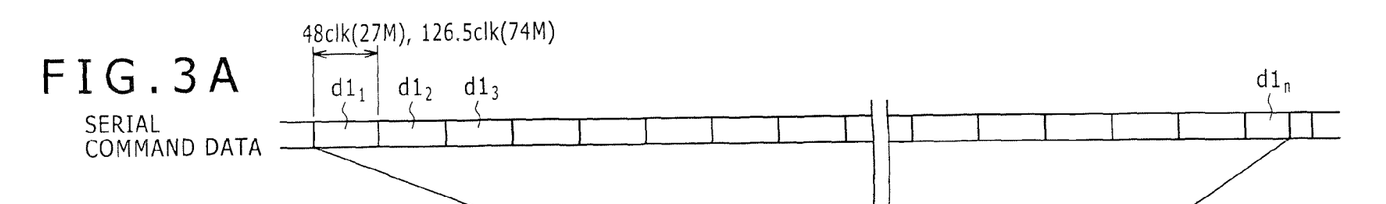
FIGS. 3A, 3B, and 3C are diagrams illustrating an exemplary configuration of a reference signal (in the case of 1080-60i) practiced as one embodiment of the invention.
Figure 3B:
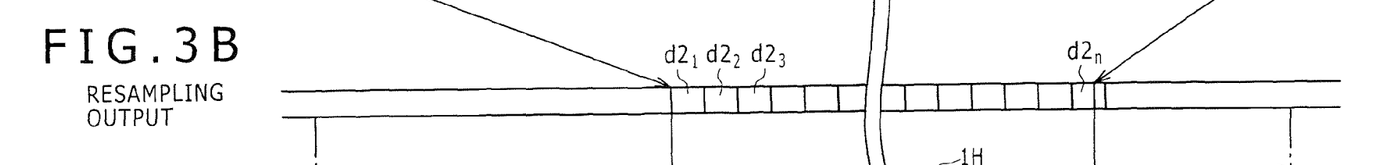
Figure 3C:
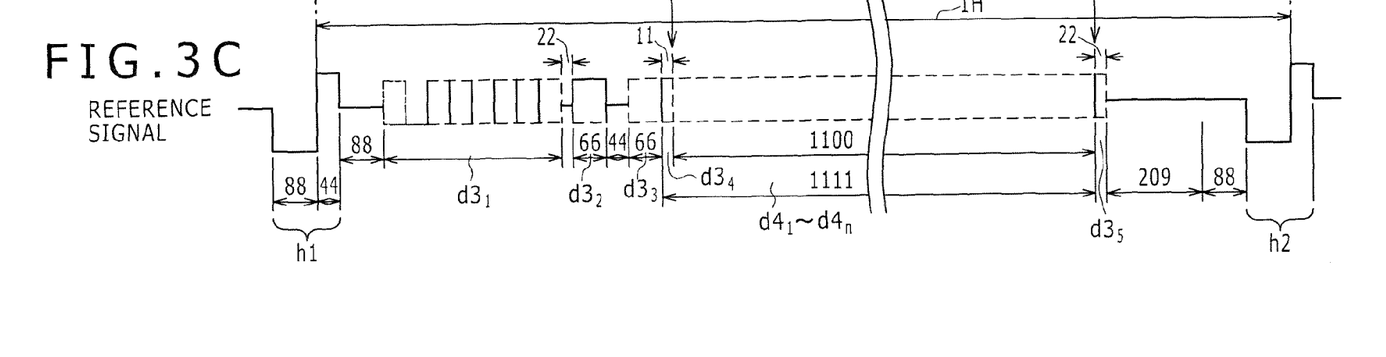

FIGS. 3A to 3C show examples of a video signal outputted from the camera apparatus 100, which is 1080-60i (namely, an interlace signal having 1080 valid scan lines and 60 frames/second). The reference signal also has the same timing.

The voltage waveform shown in FIG. 3A is a reference signal that is transmitted by the analog transmission path 92. On this reference signal, horizontal synchronous signals h1, h2, and so on are arranged at a certain period. It should be noted that the values indicative of the lengths of the sections shown in FIG. 3C are indicted by the number of clocks each being 74.25 MHz. The number of clocks in the description of FIG. 3C shown below is also the number of clocks each being of this frequency.

Each of the horizontal synchronous signals h1, h2, and so on are signals that, as shown in FIG. 3C, after the negative polarity section lowered from a reference level a predetermined level, become a positive polarity section raised from the reference level a predetermined level. Each of the horizontal synchronous signals h1, h2, and so on is 88 clocks in the first half negative polarity section that is longer than the last half 44-clock positive polarity section. One horizontal period 1H determined by each horizontal synchronous signal has an interval of 2200 clocks.

Data, such as a control command, is superposed on a section other than the sections in which horizontal synchronous signals are arranged.

FIG. 3A shows serial command data transmitted from the control apparatus 300 side via the optical fiber cable 93. As shown in FIG. 3A, serial command data is a signal having a rate of 562.5 Kpbs. If the clock frequency is 27 MHz, this serial command data that is consecutively transmitted is 48 clocks long per data (1-bit data); if the clock frequency is 74 MHz, this serial command data is 126.5 clocks long. In FIG.

3A, this received serial command data is indicated as $d1_1$, $d1_2$, $d1_3$, . . . , $d1_n$ (n being the number of items of data in one horizontal scan interval).

The serial command data shown in FIG. 3A is digitally converted by the clock having a sampling frequency of 37 MHz and then converted into an analog voltage by the clock of 74 MHz. This resampling provides the compressed data as shown in FIG. 3B. To be more specific, $d1_1$, $d1_2$, $d1_3$, . . . , $d1_n$ shown in FIG. 3A are converted data $d2_1$, $d2_2$, $d2_3$, . . . , $d2_n$ having a data length of ½ for each horizontal scan interval 1H.

The resultant data $d2_1$ through $d2_n$ provide voltage signals $d4_1$ through $d4_n$ superposed on the reference signal so as for each bit to be indicated as an analog voltage value as shown in FIG. 3C. Namely, by changing a voltage value (the low level) if each bit is "0" data and a voltage value (the high level) if each bit is "1" data, these data are arranged as signals $d4_1$ through $d4_n$ in the asynchronous signal section of the reference signal.

Immediately before the serial command data arrangement section of this reference signal, a lead portion $d3_4$ that is an extension of the voltage value of the first data $d2_1$ is arranged and an inverted lead portion $d3_3$ obtained by inverting the level of the lead portion $d3_4$ is arranged. The inverted lead portion $d3_3$ is longer in section than the lead portion $d3_4$.

Further, immediately after the serial command data arrangement section, a tail portion $d3_5$ that is the extension of the voltage value of the last data $d2_n$ is arranged.

Before the lead portion $d3_4$ and the inverted lead portion $d3_3$ in the serial command arrangement section, an arrangement section of a frame synchronous signal $d3_2$ that is a flag indicative of the start position of the frame is arranged. This arrangement section of the frame synchronous signal $d3_2$ goes high one line before the start horizontal scan interval of one frame and goes low in other horizontal scan intervals. This frame synchronous signal $d3_2$ is used for a vertical synchronous signal. It should be noted that, in the case of the reference signal shown in FIGS. 3A to 3C, the frame synchronous signal $d3_2$ is used for a vertical synchronous signal. Therefore, the vertical synchronous signal included in the related-art analog video signal is not arranged. Consequently, the serial command data shown in FIG. 3C can be arranged on all horizontal lines of the reference signal.

In addition, the data arrangement section $d3_1$ having a predetermined number of bits is prepared between the horizontal synchronous signal h1 and the frame synchronous signal $d3_2$. In this data arrangement section $d3_1$, various data, such as flag and ID, are arranged as required.

The reference signal shown in FIG. 3C is processed by the mixing block 214 under the control of the central processing unit 206 of the adaptor apparatus 200 in which each item of data is superposed as a voltage value. The processed reference signal is transmitted over the analog transmission path 92. In the camera apparatus 100 receiving the reference signal shown in FIG. 3C, the separation block 112 separates a synchronous signal component from each item of data, thereby taking out data $d2_1$ through $d2_n$ shown in FIG. 3B.

The separated data is converted by the analog/digital converter 115 into digital data by a sampling frequency of 74 MHz and then converted by the digital/analog converter 117 into analog data by a sampling frequency of 37 MHz. By these conversion operations, the compressed data $d2_1$ through $d2_n$ shown in FIG. 3B are restored to the original consecutive serial command data $d1_1$ through $d1_n$ shown in FIG. 3A to be supplied to the central processing unit 119.

Transmission of data, such as a command, as superposed on the reference signal, from the adaptor apparatus 200 to the camera apparatus 100 allows the connection between the camera apparatus 100 and the adaptor apparatus 200 with two cables of the digital transmission path 91 and the analog transmission path 92.

To be more specific, the novel configuration eliminates the transmission path of control commands required in related-art technologies as shown in FIG. 7. This simplifies the connection configuration of the camera apparatus to peripheral devices, thereby significantly improving the cable laying and camera handling operations.

Transmission of data, such as a command, from the camera apparatus 100 to the adaptor apparatus 200 is executed by using the auxiliary area of each digital video signal, thereby enabling the bidirectional communication of command data.

In addition, in the case of the present embodiment, the reference signal to be received by the camera apparatus 100 is an analog signal, so that a comparatively simple configuration, such as the PLL circuit 113 for example in the camera apparatus 100, allows the processing of synchronization with the timing indicated by this reference signal. Consequently, the camera apparatus 100 that takes images upon instruction from the control apparatus 300 and under the control of control commands supplied at the time of image taking can be configured with simplicity.

In this case, the serial commands consecutively outputted from the control apparatus 300 are compressed to be arranged in a section other than the synchronous signal sections of the reference signal and the compressed commands are decompressed to the original state at the reception side, thereby enabling the good transmission of commands without affecting the reference signal.

In addition, the lead and tail of each section in which the voltage signals of the bits of a serial command are superposed have the sections that are extensions of the first data and the last data, thereby providing an advantage of easily detecting the command arrangement section in each horizontal line by the camera apparatus that is the reception side.

Further, in the example shown in FIGS. 3A to 3C, a frame synchronous signal $d3_2$ is arranged to indicate a timing of frame period, thereby eliminating the necessity of arranging the related-art vertical synchronous signal in the reference signal. Consequently, command data and so on can be superposed in all horizontal lines, thereby consecutively transmitting serial commands under a good condition.

Figure 4A:
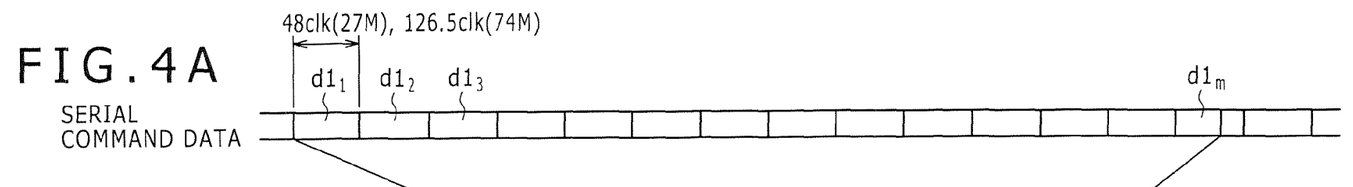
FIGS. 4A, 4B, and 4C are diagrams illustrating an exemplary configuration of a reference signal (in the case of 720-60p) practiced as one embodiment of the invention.
Figure 4B:
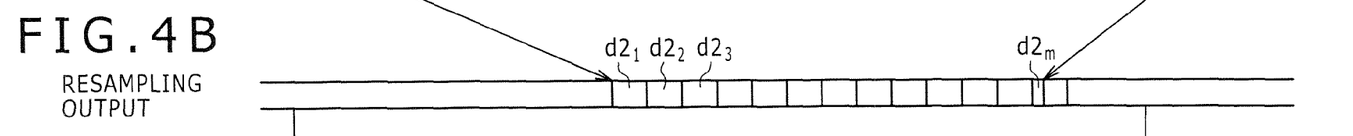
Figure 4C:
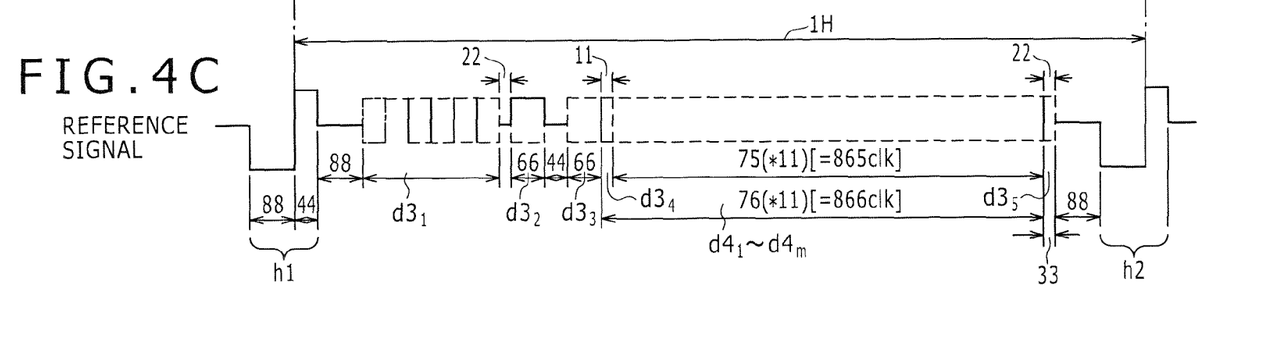

Referring to FIGS. 4A to 4C, there is shown an example of a signal with a video signal outputted from the camera apparatus 100 being 720-60p (namely, a progressive signal having a valid scan lines 720 and 60 frames/second). For the reference signal, a signal having the same timing is used. The examples shown in FIGS. 4A to 4C are generally the same in configuration as the examples shown in FIGS. 3A to 3C except the data length and arrangement number of each item of data. Because the length of one horizontal scan interval 1H is different from that of the examples shown in FIGS. 3A to 3C, the number of items of data arranged in the reference signal of one horizontal line differs from that shown in the examples of FIGS. 3A to 3C.

The voltage waveform shown in FIG. 4C is the reference signal to be transmitted over the analog transmission path 92 in this case. This reference signal is arranged with horizontal synchronous signals h1, h2, and so on at a certain period. It should be noted that the values indicative of the lengths of the sections shown in FIG. 3C are indicted by the number of clocks each being 74.25 MHz. The number of clocks in the description of FIG. 4C shown below is also the number of clocks each being of this frequency.

As shown in FIG. 4C, each of the horizontal synchronous signals h1, h2, and so on are signals varying from the negative polarity section in which the signals become lower from a reference level by a predetermined level to the positive polarity section in which the signals become higher from the reference level by a predetermined level. Each of the horizontal synchronous signals h1, h2, and so on is 88 clocks in the first half negative polarity section that is longer than the last half 44-clock positive polarity section. One horizontal period 1H determined by each horizontal synchronous signal has an interval of 1650 clocks.

Data, such as a control command, is superposed on a section other than the section in which horizontal synchronous signals are arranged.

FIG. 4A shows serial command data transmitted from the control apparatus 300 side via the optical fiber cable 93. As shown in FIG. 4A, serial command data is a signal having a rate of 562.5 Kpbs. In FIG. 4A, this received serial command data is indicated as $d1_1$, $d1_2$, $d1_3$, . . . , $d1_m$ (m being the number of items of data in one horizontal scan interval).

The serial command data shown in FIG. 4A digitally converted by the clock having a sampling frequency of 37 MHz and then converted into an analog voltage by the clock of 74 MHz. This resampling provides the compressed data as shown in FIG. 4B. To be more specific, $d1_1$, $d1_2$, $d1_3$, . . . , $d1_m$ shown in FIG. 4A are converted data $d2_1$, $d2_2$, $d2_3$, . . . , $d2_m$ having a data length that is ½ for each horizontal scan interval 1H.

The resultant data $d2_1$ through $d2_m$ provide voltage signals $d4_1$ through $d4_m$ superposed on the reference signal so as for each bit to be indicated as an analog voltage value as shown in FIG. 4C. Namely, by changing a voltage value (low level) if each bit is "0" data and a voltage value (high level) if each bit is "1" data, these data are arranged as signals $d4_1$ through $d4_m$ in the asynchronous signal section of the reference signal.

The configurations of the data arrangement section $d3_1$, the frame synchronous signal $d3_2$, the inverted lead portion $d3_3$, the lead portion $d3_4$, and the tail portion $d3_5$ are substantially the same as those described with reference to FIG. 3.

As shown in FIGS. 4A to 4C, the video signal of 720-60p also allows the transmission of control commands as superposed on the analog reference signal, providing substantially the same effect as that of the video signal of 1080-60i described before.

(4) Other Configurations of Transmission Signals

The following describes another exemplary configuration of an analog reference signal that is transmitted from the adaptor apparatus 200 to the camera apparatus 100 via the analog transmission path 92, with reference to FIGS. 5A to 5C and FIGS. 6A to 6C.

Figure 5A:
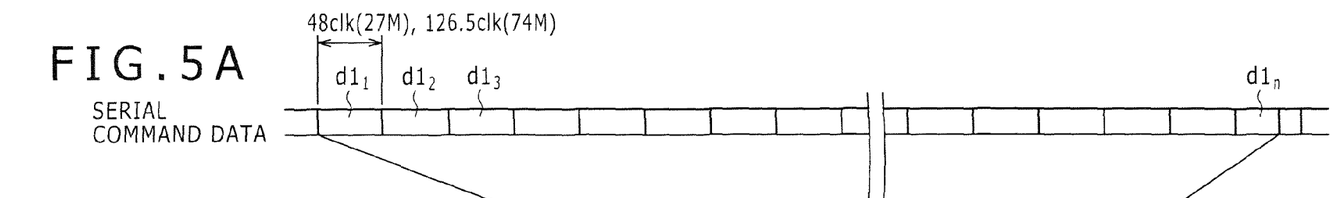
FIGS. 5A, 5B, and 5C are diagrams illustrating another exemplary configuration of a reference signal (in the case of 1080-60i) practiced as one embodiment of the invention.
Figure 5B:
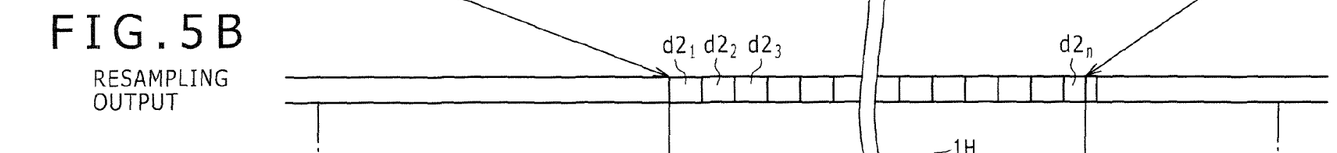
Figure 5C:
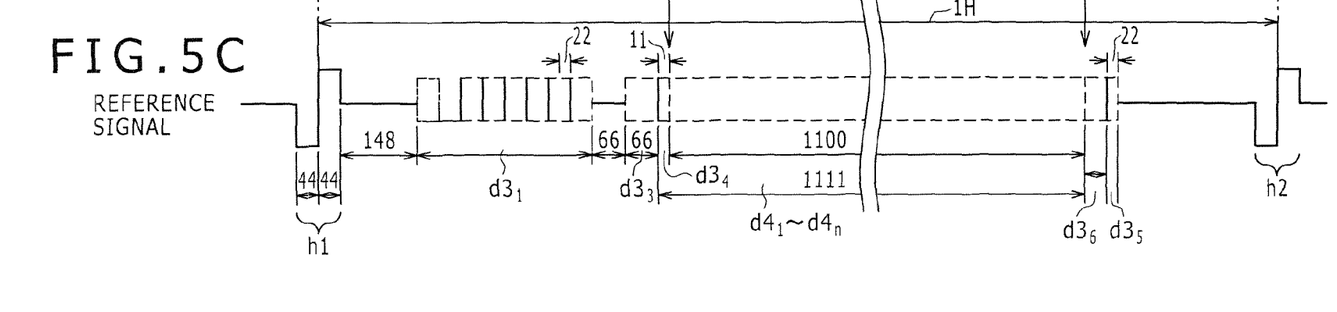

FIGS. 5A to 5C show examples in which a video signal to be outputted from the camera apparatus 100 and a reference signal to be entered in the camera apparatus 100 are signals of 1080-60p (namely, interlace signals with the number of valid scan lines being 1080 and 60 frames/second).

Figure 6A:
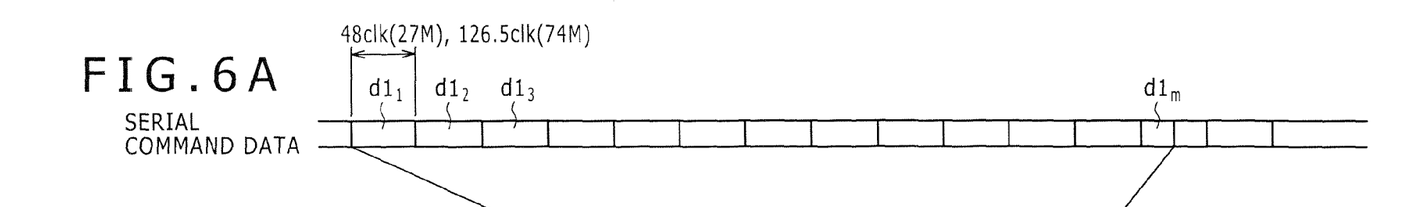
FIGS. 6A, 6B, and 6C are diagrams illustrating still another exemplary configuration of a reference signal (in the case of 720-60p) practiced as one embodiment of the invention.
Figure 6B:
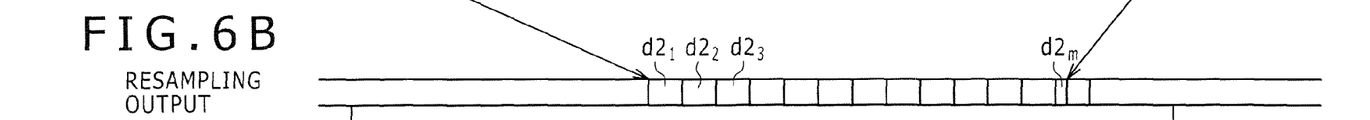
Figure 6C:
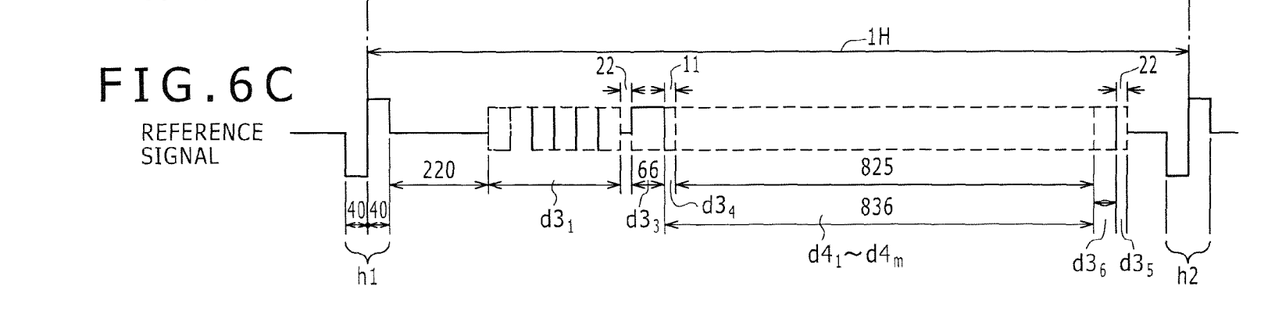

FIGS. 6A to 6C show examples in which a video signal to be outputted from the camera apparatus 100 and a reference signal to be entered in the camera apparatus 100 are signals of 720-60p (namely, progressive signals with the number of valid scan lines being 720 and 60 frames/second).

The examples shown in FIGS. 5A to 5C and FIGS. 6A to 6C show reference signals with a vertical synchronous signal also arranged on a predetermined horizontal line in addition to horizontal synchronous signals $h_1$, $h_2$, and so on.

For the horizontal line on which a vertical synchronous signal is arranged, the vertical synchronous signal pattern thereof, not shown, is arranged, so that no control command is arranged. Hence, as it is, the volume of transmission of control commands is insufficient by the horizontal line on which the vertical synchronous signal is arranged.

Therefore, in the examples shown in FIGS. 5A to 5C, an extended section $d3_6$ is arranged as the reference signal, immediately after the voltage signals $d4_1$ through $d4_n$ with commands indicated as analog voltage values as shown in FIG. 5C, for example. The shortage of horizontal line with the vertical synchronous signal arranged is made up for by arranging the voltage signal for one bit of the control command in the extended section $d3_6$ of each horizontal line.

In the example shown in FIGS. 6A to 6C, an extended section $d3_6$ is arranged as the reference signal immediately after the voltage signals $d4_1$ through $d4_m$ with commands indicated as analog voltage values as shown in FIG. 6C, for example. The shortage of horizontal line with the vertical synchronous signal arranged is made up for by arranging the voltage signal for one bit of the control command in the extended section $d3_6$ of each horizontal line.

It should be noted that, in order to transmit vertical synchronous signals, the frame synchronous signal $d3_2$ shown in FIG. 3C is not arranged in the example shown in FIG. 5C and the example shown in FIG. 6C.

The other portions shown in FIGS. 5A to 5C and FIGS. 6A to 6C are configured in substantially the same manner as the signals shown in FIGS. 3A to 3C and FIGS. 4A to 4C.

Thus, the above-mentioned problems can be solved also in the case of an analog video signal with the vertical synchronous signal and the horizontal synchronous signal arranged as the reference signal.

It should be noted that, in the above-mentioned embodiments, a POV camera apparatus is used for the camera apparatus; it is also practicable to use an ordinary camera apparatus having a monitor (or a finder).

In the above-mentioned embodiments, the mate of the camera apparatus for signal transmission is an adaptor apparatus; it is also practicable to arrange another apparatus that can receive or relay video signals outputted from the camera apparatus in the case where the signal transmission is executed between a processing apparatus having another configuration and the camera apparatus. For example, the camera apparatus 100 and the control apparatus 300 shown in FIG. 1 may be interconnected directly by the digital transmission path 91 and the analog transmission path 92.

Alternatively, the adaptor apparatus 200 and the control apparatus 300 shown in FIG. 1 may be interconnected directly by the digital transmission path 91 and the analog transmission path 92.

The configurations of the reference signals shown in FIG. 3A through FIG. 6C are preferable examples, so that the specific arrangement positions and the specific values of data lengths are not limited to those shown in these diagrams.

The present application contains subject matter related to that disclosed in Japanese Priority Patent Application JP 2009-291061 filed in the Japan Patent Office on Dec. 22, 2009, the entire content of which is hereby incorporated by reference.

While preferred embodiments of the present invention have been described using specific terms, such description is for illustrative purpose only, and it is to be understood that changes and variations may be made without departing from the spirit or scope of the following claims.

What is claimed is:

1. A transmission system comprising:
a digital transmission path configured to transmit a digital video signal outputted from an imaging apparatus to a processing apparatus that executes one of processing and relaying of a video signal received from said imaging apparatus;

an analog transmission path configured to transmit an analog reference signal outputted from said processing apparatus to said imaging apparatus, said analog reference signal including successive horizontal synchronous sections determined by horizontal synchronous signal components, the horizontal synchronous sections including data sections and command sections;

a command superposing block in said processing apparatus configured to superpose, at an analog level, bits of command data for commanding said imaging apparatus in command sections of the analog reference signal in which the horizontal synchronous signal component is not included, said command data comprised of a serial command consecutively obtained at a predetermined data rate, said serial command being compressed in data rate in unit of one horizontal period interval, the compressed serial command being arranged in said command section;

a digital conversion block configured to digitally convert an analog-level signal of each bit of a command included in a reference signal received via said analog transmission path in said imaging apparatus; and an imaging control block configured to control an imaging operation with a timing synchronized with the horizontal synchronous signal component included in the reference signal received via said analog transmission path and discriminate a command converted by said digital conversion block, thereby executing processing corresponding to the discriminated command in said imaging apparatus.

2. The transmission system according to claim 1, wherein said analog reference signal has a position for arranging in a section not the command section a flag indicative of a start position of a video frame at a predetermined position inside one horizontal period interval defined by said horizontal synchronous signal component.

3. The transmission system according to claim 2, wherein a section in which a first bit and a last bit in said command section are arranged is extended longer than a section of another bit position.

4. The transmission system according to claim 3, wherein, immediately before the section in which the first bit in said command section is arranged, an analog level obtained by inverting said first bit is arranged.

5. An imaging apparatus comprising:
an imaging processing block configured to take an image to obtain a video signal;
a digital video signal output block configured to output a video signal obtained by said imaging processing block to a digital transmission path;
an analog reference signal input block configured to input an analog reference signal into said imaging apparatus, said analog reference signal including successive horizontal synchronous sections determined by horizontal synchronous signal components, the horizontal synchronous sections including data sections and command sections,
the command sections having superposed, at an analog level and in which the horizontal synchronous signal component is not included, command data comprised of a serial command consecutively obtained at a predetermined data rate and being compressed in data rate in unit of one horizontal period interval;

a digital conversion block configured to digitally convert a signal of an analog level of each bit of command data included in command sections of said reference signal entered through said analog reference signal input block; and a controller configured to control an imaging operation by said imaging processing block with a timing synchronized with the horizontal synchronous signal component included in the reference signal entered through said analog reference signal input block and discriminate the command converted by said digital conversion block, thereby executing control processing corresponding to the discriminated command.

6. A transmission method of signal transmission by use of a digital transmission path configured to transmit a digital video signal outputted from an imaging apparatus to a processing apparatus that executes one of processing and relaying of a video signal received from said imaging apparatus and an analog transmission path configured to transmit an analog reference signal outputted from said processing apparatus to said imaging apparatus, said analog reference signal including successive horizontal synchronous sections determined by horizontal synchronous signal components, the horizontal synchronous sections including data sections and command sections, said transmission method comprising the steps of:

superposing, at an analog level, bits of command data for commanding said imaging apparatus in command sections of the analog reference signal in which the horizontal synchronous signal component is not included, said command data comprised of a serial command consecutively obtained at a predetermined data rate, said serial command being compressed in data rate in unit of one horizontal period interval, the compressed serial command being arranged in said command section;

digitally converting an analog-level signal of each bit of a command included in a reference signal received via said analog transmission path; and controlling an imaging operation with a timing synchronized with the horizontal synchronous signal component included in the reference signal received via said analog transmission path and discriminating a command converted by said digital conversion block, thereby executing processing corresponding to the discriminated command.

7. An imaging apparatus comprising:
imaging processing means for taking an image to obtain a video signal;
digital video signal output means for outputting a video signal obtained by said imaging processing means to a digital transmission path;
an analog reference signal input means for inputting an analog reference signal into said imaging apparatus, said analog reference signal including successive horizontal synchronous sections determined by horizontal synchronous signal components, the horizontal synchronous sections including data sections and command sections,
the command sections having superposed, at an analog level and in which the horizontal synchronous signal component is not included, command data comprised of a serial command consecutively obtained at a predetermined data rate and being compressed in data in unit of one horizontal period interval;
digital conversion means for digitally converting a signal of an analog level of each bit of command data included in command sections of said reference signal entered through said analog reference signal input means; and controlling means for controlling an imaging operation by said imaging processing means with a timing synchronized with the horizontal synchronous signal component included in the reference signal entered through said analog reference signal input means and discriminating the command converted by said digital conversion means, thereby executing control processing corresponding to the discriminated command.

* * * * *